United States Patent
Bogoslofski et al.

(10) Patent No.: US 8,167,180 B2
(45) Date of Patent: May 1, 2012

(54) LEAN SUPPORT FOR ELONGATE ARTICLES ON A LOAD CARRIER

(75) Inventors: Kevin Bogoslofski, Southington, CT (US); Fred Murray, Southington, CT (US); Gregor Weaver, Waterbury, CT (US); Fredric Clark, Woodbury, CT (US)

(73) Assignee: Thule Sweden AB (SE)

( * ) Notice: Subject to any disclaimer, the term of this patent is extended or adjusted under 35 U.S.C. 154(b) by 338 days.

(21) Appl. No.: 11/306,848

(22) Filed: Jan. 12, 2006

(65) Prior Publication Data

US 2006/0273122 A1    Dec. 7, 2006

Related U.S. Application Data

(63) Continuation of application No. 11/159,125, filed on Jun. 23, 2005, now abandoned.

(60) Provisional application No. 60/522,055, filed on Aug. 7, 2004, provisional application No. 60/582,388, filed on Jun. 23, 2004.

(51) Int. Cl.
    *B60R 9/00* (2006.01)
(52) U.S. Cl. ........ 224/325; 224/321; 224/324; 224/553; 224/558; 224/568
(58) Field of Classification Search .......... 224/324, 224/326, 319, 553, 568, 405, 282, 309, 310, 224/321, 546, 558, 325; 211/171; 410/116
See application file for complete search history.

(56) References Cited

U.S. PATENT DOCUMENTS

| | | | | |
|---|---|---|---|---|
| 4,616,771 A * | 10/1986 | Heideman | ...................... | 224/321 |
| 5,076,479 A * | 12/1991 | Davison | ........................ | 224/324 |
| 5,456,396 A * | 10/1995 | Allen | ............................ | 224/321 |
| 5,752,638 A * | 5/1998 | Meeks | .......................... | 224/547 |
| 5,775,557 A * | 7/1998 | Arvidsson | .................... | 224/310 |
| 5,951,231 A * | 9/1999 | Allen | ............................ | 414/462 |
| 6,164,507 A * | 12/2000 | Dean et al. | .................... | 224/324 |
| 6,296,162 B1 * | 10/2001 | Englander et al. | ............ | 224/324 |
| 6,561,396 B2 * | 5/2003 | Ketterhagen | .................. | 224/310 |
| 6,868,998 B2 * | 3/2005 | Dean | ............................. | 224/324 |
| 2003/0071097 A1 * | 4/2003 | Dean | ............................. | 224/319 |
| 2006/0186153 A1 * | 8/2006 | Ilgenfritz | ...................... | 224/309 |
| 2006/0196904 A1 * | 9/2006 | Tucker | .......................... | 224/310 |

* cited by examiner

*Primary Examiner* — Gary Elkins
*Assistant Examiner* — Corey Skurdal
(74) *Attorney, Agent, or Firm* — Novak Druce + Quigg LLP

(57) ABSTRACT

A method and arrangement for providing a load carrying apparatus for securing an elongate article, such as a canoe of kayak, to a vehicle generally includes a plurality of load bars, a guide pivotally secured to each of the load bars, an aperture disposed along a length of each guide, and at least one retaining strap threadably received by each aperture. The at least one retaining strap is disposed about the elongate article and is secured to the load bars such that the elongate article may be secured between the retaining strap and the guide. In a preferred aspect, the retaining strap is disposed through the aperture, about the elongate article, about the load bars, and is secured to itself under a tensioning force.

27 Claims, 3 Drawing Sheets

LEAN SUPPORT FOR ELONGATE ARTICLES ON A LOAD CARRIER

CROSS-REFERENCE TO RELATED APPLICATIONS

The present application is a continuation application of U.S. application Ser. No. 11/159,125 filed Jun. 23, 2005 which claims the benefit of U.S. Provisional Application Nos. 60/522,055 filed Aug. 7, 2004 and 60/582,388 filed Jun. 23, 2004. Said applications are expressly incorporated herein by reference in their entireties.

FIELD OF THE INVENTION

The present invention relates generally to an apparatus for securing elongate articles to a vehicle load carrier. More specifically the invention relates to an apparatus for preventing damage that may occur during mounting and transport of watercraft, such as kayaks or canoes, upon vehicle load carriers.

BACKGROUND OF THE INVENTION

Vehicular mounted sports equipment racks are well known as load carriers for carrying equipment from storage facilities to locations provided for a variety of recreational activities. Suitable vehicle mounting points for sports equipment racks optionally include the rear or the roof of a carrier vehicle. Rear mounted racks and roof racks may be used to transport bicycles, snow skis, snowboards, surfboards, and small water craft such as canoes and kayaks. Depending on the size of a piece of equipment, it may be possible for a single person to lift and load an item without the need of assistance. The loading of larger, heavier items, such as canoes and kayaks, however, typically requires more than one individual to raise the craft onto the equipment rack and to secure it in place using multiple retaining devices.

For sports such as kayaking, there may be a need to transport more than one craft depending on the number of kayak enthusiasts occupying a single vehicle. The need to carry more than one kayak increases the difficulty of loading and securing these craft onto the transporting vehicle. Attachment of kayaks to a load carrying sports equipment rack on a vehicle requires a rack structure that holds a first craft in place during loading of additional watercraft. Rack structures that support one watercraft while another is being loaded are presently readily available. Such devices typically use retaining straps wrapped around the kayaks between a pair of roof-mounted supports and the load bars of the vehicle roof rack which is mounted on the roof of a vehicle. It is possible, during loading of these devices, for a retaining strap to become entangled with the roof rack itself or for a portion of a strap to be trapped under a kayak previously loaded onto the sports equipment rack. While the application of tension to such entangled or trapped retaining strap may appear to sufficiently secure the craft to the vehicle, during transit it is possible for one or more of the retaining straps to become untangled or loosened. This is undesirable as untangled or loosened retaining straps can result in the shifting of the watercraft during transport, damage or loss of the watercraft, damage or loss to the transporting vehicle, damage or loss to other vehicles, or result in severe injury to nearby persons.

In view of the above-described deficiencies associated with known rack structures, there is a longfelt need to provide an improved rack structure for transporting elongate articles, such as canoes and kayaks, that overcomes these and other deficiencies.

SUMMARY OF THE INVENTION

The present invention provides an apparatus for securely attaching elongate objects, such as canoes and kayaks, to vehicle-top load carriers. As described herein, the present invention alleviates the drawbacks described above with respect to conventional vehicle-top carriers.

An apparatus according to the present invention provides secure fastening of one or more elongate articles, e.g., watercraft, to a roof rack for transportation on a vehicle. The apparatus includes a hinged guide, also referred to herein as a lean support, having an aperture in a strap retention head to receive a retaining strap used to secure a watercraft, such as a kayak, to the roof rack. As configured, the hinged lean support provides rotation of the strap retention head relative to the roof rack.

A process for mounting a kayak or similar watercraft on a vehicle's roof rack includes passing a first strap through the aperture of the strap retention head and around a first, forward load bar, of a load carrier, so that the bow portion of the kayak leans against the lean support and rests on the load bar. After routing the retaining strap the kayak may be secured in place by drawing the free end of the retaining strap through a first buckle, which exerts a gripping force to prevent slippage of the forward retaining strap. Use of a second lean support with a second retaining strap secures the stern portion of the kayak to a second, rear load bar of a roof rack mounted on a vehicle. When not in use, hinged lean supports may be rotated about the hinge, for substantially flat storage against the roof of the vehicle. In preparation for loading a kayak, rotation of the lean supports places them at a desired orientation, typically close to vertical. The lean support includes a gripper or set device that exemplarily applies a frictional force by tightening the gripper to set and maintain the required angle and restrict movement of a lean support relative to a load bar.

A distinguishing feature of the present invention is the accurate pre-positioning of retaining straps wherein the aperture in the strap retention head holds a retaining strap so that tensioning forces produce a tight strap free of slack portions. Unlike prior devices, the height of a retaining strap above a load bar does not change between pre-positioning and tensioning of either the first retaining strap or the second retaining strap, while loading a kayak onto a vehicle's roof rack. Each retaining strap may encircle one or two kayaks prior to secure attachment of the kayaks to a load carrier by increasing the tension in the retaining straps as described previously.

More particularly, the present invention provides a guide for a strap used to secure an elongate object to a load carrier attached to the surface of a vehicle. The guide comprises (includes, but is not limited to) a mounting plate held against the carrier; and a strap retention head coupled to the mounting plate by a hinge having at least one elongate bar for joining the strap retention head to allow rotation of the strap retention head about the hinge, the strap retention head having an aperture formed therein for threading the strap therethrough. A guide further includes a gripper to prevent rotation of the at least one elongate bar when securing the elongate object to the carrier.

The present invention uses an apparatus for securing an elongate object to a load bar of a load carrier attached to the surface of a vehicle. The apparatus comprises a guide including a mounting plate held against the load carrier and a strap retention head, hingedly coupled to the mounting plate. The strap retention head has an aperture formed therein. A gripper prevents rotation of the strap retention head and at least one retaining strap threaded through the aperture, around the elongate object and the load bar provides secure attachment of the elongate object to the load carrier by application of tension to tighten the at least one retaining strap around the elongate object.

A method for securing an elongate object to a load carrier having a load bar attached to the surface of a vehicle comprises a number of steps including providing a guide including a mounting plate held against the load carrier and having a strap retention head, coupled to the mounting plate by a hinge. The strap retention head also has an aperture formed therein. Activating a gripper, that operates on the hinge, prevents rotation of the strap retention head so that the guide extends outwardly of the surface of the vehicle. Threading at least one retaining strap through the aperture, around the elongate object and the load bar of the load carrier and applying tension to tighten the at least one retaining strap around the elongate object, secures the elongate object to the load carrier.

The beneficial effects described above apply generally to the exemplary devices and mechanisms disclosed herein of a lean support according to the present invention and associated equipment used for securing watercraft, such as at least one kayak to a load carrier, typically a roof rack, of a transporting vehicle. Specific structures through which these benefits are delivered will be described in detail herein below.

BRIEF DESCRIPTION OF THE DRAWINGS

The invention will now be described in greater detail, by way of example only, with reference to the attached drawings, in which.

DETAILED DESCRIPTION OF THE INVENTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a basis for the claims and as a representative basis for teaching one skilled in the art to variously employ the present invention.

Figure 1:
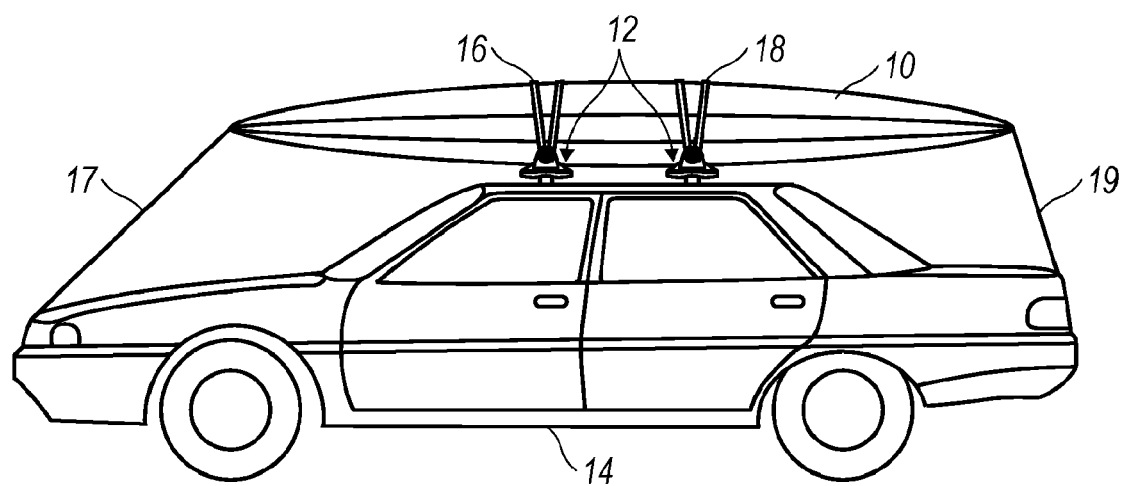
FIG. 1 is a side elevational view illustrating a watercraft; e.g., a kayak, held by an apparatus according to the present invention.

Referring now to the figures, wherein like numbers refer to like parts throughout the several views, FIG. 1 illustrates watercraft 10, e.g. a kayak, held by roof mounted apparatus 12, which is attached to vehicle 14. First, forward retaining strap 16 and second, rear retaining strap 18 provide means for securing kayak 10 to roof mounted apparatus 12, which may also be referred to herein as a roof rack. Kayak 10, after loading on roof rack 12, may further be stabilized using first tie 17, disposed between the bow of kayak 10 and the front of vehicle 14, and second tie 19 disposed between the stern of kayak 10 and the rear of vehicle 14.

Figure 2:
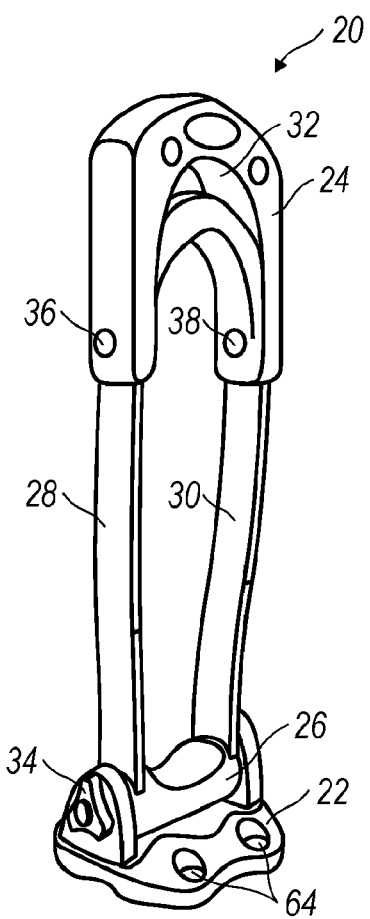
FIG. 2 is a perspective view of a lean support according to the present invention.
Figure 3:
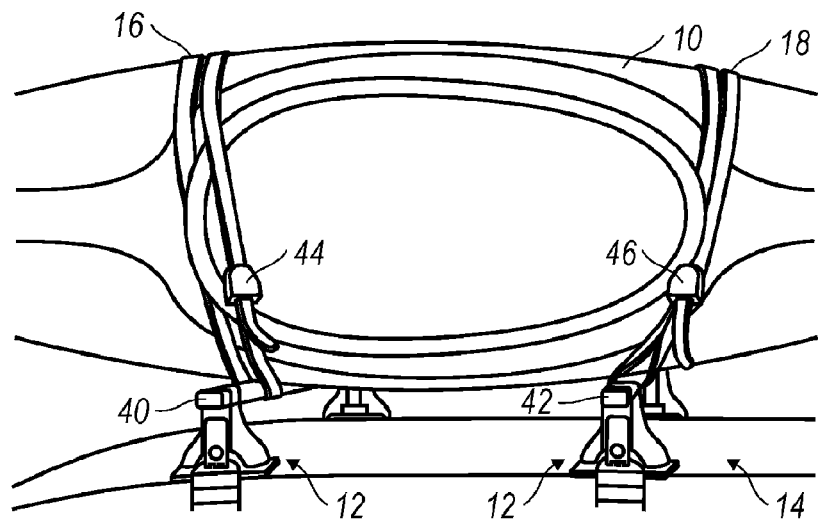
FIG. 3 is a side perspective view illustrating the topside of a kayak secured to the load bars of an equipment rack by means of retaining straps according to the present invention.
Figure 4:
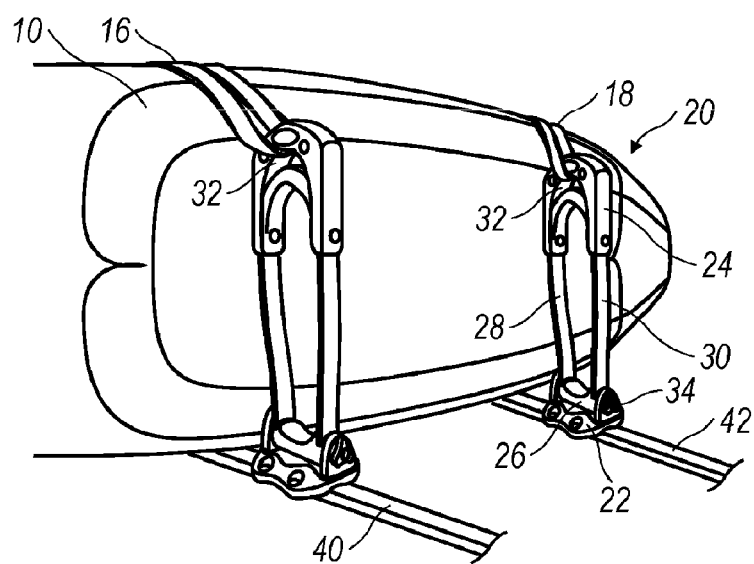
FIG. 4 is a side perspective view illustrating the bottomside of a kayak secured to the load bars of an equipment rack by means of retaining straps and lean supports according to the present invention.

FIGS. 2-4 illustrate an assembly according to the present invention for securely fastening of one or more watercraft 10 to roof rack 12 of vehicle 14. The assembly broadly includes lean support 20, comprising mounting plate 22 and strap retention head 24 having aperture 32 for receiving retaining strap 16, 18, which may be threaded through aperture 32 before securing a watercraft, such as kayak 10, to roof rack 12. Mounting plate 22 according to the present invention supports hinge 26 that has first elongate connecting bar 28 extending outwardly from hinge 26 to provide first connection 36 to strap retention head 24. Second connecting bar 30 extends outwardly from hinge 26, substantially parallel to first connecting bar 28, to provide second connection 38 to strap retention head 24. As configured, hinged lean support 20 allows rotation of strap retention head 24 relative to mounting plate 22.

FIGS. 3 and 4 illustrate the use of retaining straps 16, 18 and lean supports 20 according to the present invention to secure a watercraft, for example a kayak, to the transverse load bars of an equipment rack; i.e., a roof rack mounted on a vehicle. The figures illustrate the use of lean support 20 with first strap 16 passing through aperture 32 of strap retention head 24 and around first, forward load bar 40 to hold the bow portion of kayak 10 against lean support 20 and load bar 40. After routing retaining strap 16, as described, kayak 10 may be secured in place by drawing the free end of retaining strap 16 through first, front buckle 44, which exerts a gripping force to prevent slippage of forward retaining strap 16.

FIG. 4 shows the keel side of kayak 10 to illustrate the use of second lean support 20 with second, rear retaining strap 18 that secures the stern portion of kayak 10 to second, rear load bar 42 of roof rack 12 mounted on vehicle 14. It will be appreciated that lean supports 20 according to the present invention, when not in use, may be rotated about hinge 26, for substantially flat storage proximate the roof of vehicle 14. After rotation to a desired position, lean support 20 may be set at the desired orientation by tightening gripper 34 (See FIGS. 7a-7b). Tightening gripper 34 acts to apply a frictional force and restrict movement of the lean supports relative to load bars 40, 42 such that the lean supports may be arranged at a desired angle.

For convenience, during loading of kayak 10 onto roof rack 12, forward retaining strap 16 and rear retaining strap 18 may be pre-threaded through apertures 32 of lean supports 20. Pre-threading places retaining straps 16, 18 in position from which they may be readily tensioned around the bow or stern of kayak 10. Previously known kayak securing devices have generally been incapable of pre-positioning retaining straps, for example, at least one known device utilizes an arrow or dual-barb style top hook, whereas the present invention utilizes strap retention head 24 having strap retaining aperture 32. Further, known kayak lean supports may include coated steel posts that have arrow top hooks extending out from a load bar of an equipment rack. Retaining straps, pre-positioned around these known types of kayak lean support, initially rest on the base of the post, away from the arrow top hook. Consequently, loading and securing of a kayak with these known devices requires that the retaining strap slide up along the length of the post, from the base to the arrow top hook, where it may be held by interference with the hook. Thereafter, application of tension upon the strap acts to adjust its length around the arrow top hook and a load bar to draw the strap against the surface of the kayak, thereby holding the kayak between the arrow top hook and the load bar of an equipment rack.

The description immediately above illustrates a conventional process for loading a kayak on a roof rack using a known kayak lean support. It should be appreciated, however, that this known method requires changing the position of the retaining straps between a first location, at the base of a steel post, and a second location, at the top or opposite end of the steel post. In these types of devices, as the position of the retaining strap changes, i.e., when the retaining strap rides up the post during tensioning, it is possible for the strap to encounter obstacles, or become trapped between the surface of the kayak and the steel post. As a result, the retaining strap may not reach its intended location around the arrow top hook. Despite the fact that the retaining straps of these types of devices may not be correctly positioned with respect to an arrow top hook, it is possible to apply tension to the strap. This can suggest to the individual loading the kayak that the kayak is suitably secured to the equipment rack. As a result, if the straps of the aforementioned known devices have not been correctly installed and become untangled or loosened during transport, the kayak may no longer be safely loaded and can, as previously discussed, can present multiple safety hazards.

Accurate pre-positioning of retaining straps is a distinguishing feature of the present invention because maintaining the height of the retaining straps 16, 18 prevents the retaining straps from becoming entangled or loosened and allows a proper tension force to be applied to the retaining straps, which produces a tight strap connection free of slack. Unlike the above-described known devices, there is generally no change in the height of the retaining straps above the load bars after the retaining straps have been pre-positioned by threading through apertures 32 of strap retention heads 24. In sum, the height of first retaining strap 16 and second retaining strap 18 above respective mounting plates 22 is fixed by the position of apertures 32 in strap retention heads 24 and remains substantially unchanged between pre-positioning and tensioning of either first retaining strap 16 or second retaining strap 18.

It is also preferred, during transportation of watercraft, to protect the surfaces of both the watercraft and the transporting vehicle from damage such as dents and scratches. For this reason, materials selected to fabricate an apparatus according to the present invention include those that have sufficient structural rigidity to support items to be secured; i.e., a kayak, in combination with cushioning characteristics that are likely to reduce the incidence of damage to the article being transported or the transporting vehicle. Suitable materials can include metals and relatively rigid rubbers and plastics. As needed, these materials may also be provided with soft covers for added protection over components that could have sharp projections, such as front and rear buckles 44, 46, which are required to maintain retaining straps 16, 18 under requisite tension to secure watercraft 10 to roof rack 12.

Figure 5:
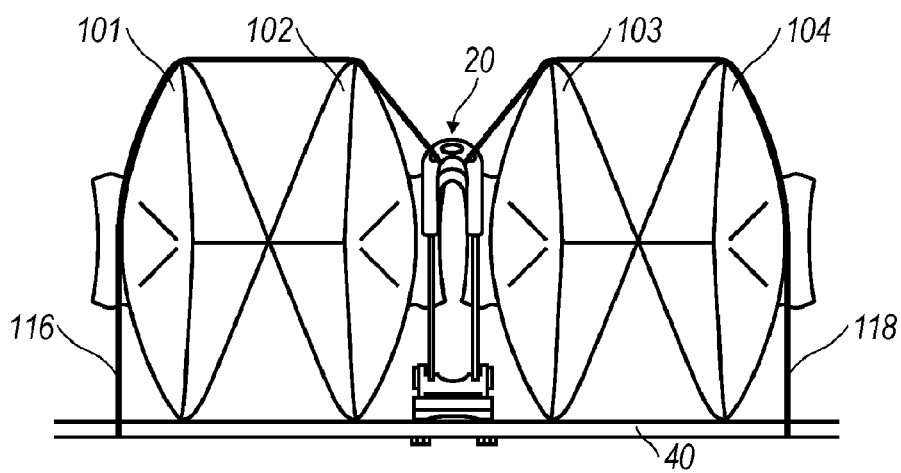
FIG. 5 is a schematic cross-sectional view illustrating the use of lean supports and retaining straps according to the present invention to secure a number of watercraft against the load bars of a vehicle-mounted equipment rack.

FIG. 5 is a schematic cross section, viewed from the front of a transporting vehicle showing lean support 20 attached to load bar 40 and having four kayaks 101, 102, 103, 104 secured to opposite sides of the load bar using a pair of forward retaining straps 116, 118. As illustrated in FIG. 5, lean supports 20 are configured to accommodate a plurality of watercraft held securely against load bars 40, 42 of vehicle-mounted equipment rack 12. As similarly described with regard to retaining straps 16 and 18, retention of a given object utilizing retraining straps 116 and 118 involves passing retaining straps 116 and 118 through apertures 32 of a strap retention heads 24 of lean supports 20 then and around load bars 40 and 42 before joining the free ends of retaining straps 116 and 118 using a fastening device, e.g., a buckle (not shown), to form a loop between the strap retention heads and load bars 40 and 42. The hull of kayak 10, for example, placed inside the loop may be secured against lean supports 20 and load bars 40 and 42 by applying tension to the loop to reduce its size so that retaining straps 116 and 118 fit snugly around the hull of kayak 10.

Figure 6:
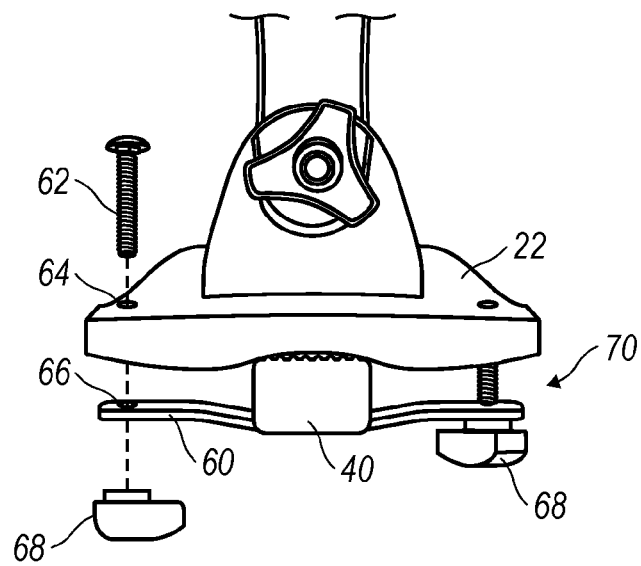
FIG. 6 is an elevational view illustrating a bracket used to attach a mounting plate according to the present invention to a load bar of an equipment rack.
Figure 7A:
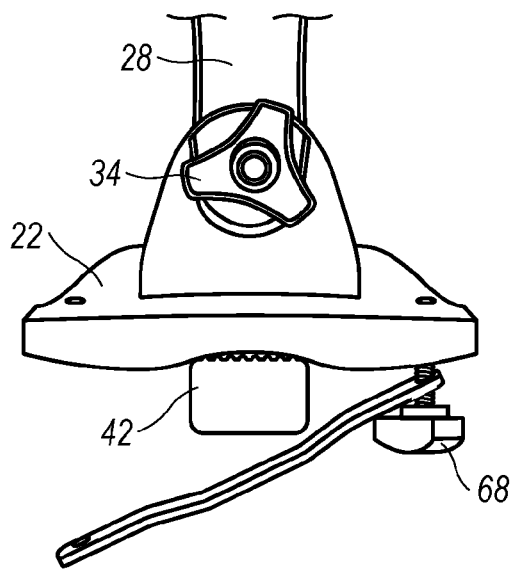
FIGS. 7a-7b are elevational views illustrating attachment of a mounting plate according to the present invention to differently shaped load bars.
Figure 7B:
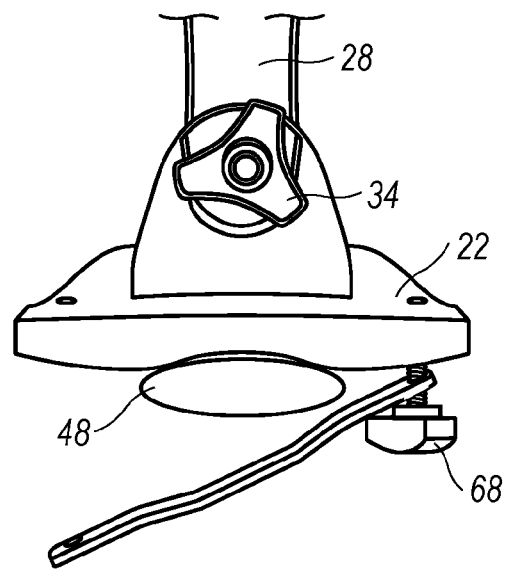

Referring now to FIGS. 6 and 7a-7b, which are partial cross-sectional views of assemblies for mounting lean supports 20 to the load bars of a roof rack; bracket 60 attaches mounting plate 22 to load bars 40, 42 of an equipment rack. A load bar is held between mounting plates 22 and brackets 60 by inserting fasteners 62, e.g., bolts, through each of several throughbores 64 in mounting plates 22 and through throughbores 66 at each end of brackets 60. The application of knobs 68 to each of bolts 62 passing through opposing openings 66 in each of brackets 60 provides connection assembly 70 connecting the brackets to the mounting plates. Tightening the knobs to the bolts increases the gripping force between brackets 60 and mounting plates 22 for firm attachment of lean supports 20 to load bars 40 and 42. Preferably, mounting plates 22 includes four throughbores 64 and require two brackets 60 and two connection assemblies 70 for firm attachment to load bars 40 and 42.

Alternatively, as illustrated in FIG. 7b, the invention may be configured to comprise load bars 48, which have a different cross-sectional shape than that of load bars 40 and 42. It is seen however, that load bars 48 may be configured to utilize the same brackets 60 and connection assemblies 70 for attaching mounting plate 22.

A lean support according to the present invention and an apparatus used for securing watercraft such as kayaks to a load carrier of a transporting vehicle and related components have been described herein. These and other variations, which will be appreciated by those skilled in the art, are within the intended scope of this invention as claimed below. As previously stated, detailed embodiments of the present invention are disclosed herein; however, it is to be understood that the disclosed embodiments are merely exemplary of the invention that may be embodied in various forms.

What is claimed is:

1. A load carrying apparatus that conveniently positions a securement strap on a vehicular load carrier that is used to secure an elongate article to a carrying vehicle, said apparatus comprising:

a mounting arrangement to be anchored to a vehicular load carrier midway between driver and passenger sides of the carrying vehicle;

a lean support configured to receive at its sides the weight of the elongate article for leaning thereagainst, said lean support pivotally attached to said mounting arrangement and comprising two parallel elongate extensions and a strap retention head, said elongate extensions extending from said mounting arrangement and being received by said strap retention head at least one connection point, said strap retention head being located midway between said driver and passenger sides of said vehicle, in the event said mounting arrangement is anchored to the vehicular load, carrier, and having an aperture formed therein and configured to threadably receive a securement strap therethrough thereby trapping said strap at said strap retention head for ready grasping by an operator installing the elongate article onto the load carrying apparatus; and a set device for maintaining a plurality of operator-set orientations of said elongate extension, relative to said mounting arrangement and perpendicular to the vehicular load carrier, in the event said mounting arrangement is anchored to the vehicular load carrier, thereby accommodating variable configuration of said load carrying apparatus.

2. The load carrying apparatus as recited in claim 1, wherein said mounting arrangement further comprises a mounting plate that includes a plurality of open channels extending through the mounting plate to receive bolts of connecting assemblies used to attach the mounting arrangement to said vehicular load carrier.

3. The load carrying apparatus as recited in claim 2, wherein the connecting assemblies comprise an elongate bracket having an opening at opposing ends for engaging bolts inserted into the open channels of the mounting plate.

4. The load carrying apparatus as recited in claim 1, wherein the two elongate extensions include a first elongate bar and a second elongate bar attached to opposite sides of a hinge, the first elongate bar orientated substantially parallel to the second elongate bar.

5. The load carrying apparatus as recited in claim 1, wherein the mounting arrangement is configured to receive an elongate article on each side of the mounting arrangement at the same time, said each side being directed toward opposite lateral sides of said vehicle and said retention head configured to threadably receive two retention straps extending from either lateral side of said vehicle, wherein the lateral sides of the vehicle are the driver and passenger sides.

6. The load carrying apparatus as recited in claim 1, wherein the strap retention head is located at a centerline portion of the vehicle, said centerline portion extending along the center of the vehicle in the longitudinal direction of said vehicle.

7. The load carrying apparatus of claim 1, wherein the plurality of operator-set orientations of said elongate extension include operator-set orientations between a substantially horizontal orientation relative to said mounting arrangement and a substantially vertical orientation relative to said mounting arrangement.

8. An apparatus for securing an elongate object to a load bar of a load carrier attached to a vehicle, said apparatus comprising:
a guide including a mounting arrangement to be anchored to a load carrier mounted to a vehicle,
said guide comprising a lean support configured to receive at its sides the weight of an elongate article hingedly coupled to said mounting arrangement and located midway between driver and passenger sides of the vehicle, said lean support comprising at least one elongate extension and a strap retention head being mounted to said at least one elongate extension and said strap retention head having a closed aperture formed therein;
a set device that prevents rotation of said strap retention head relative to said mounting arrangement; and
a retaining strap to be threaded through said aperture, around an elongate object and a load bar of said load carrier thereby securing said elongate object to said load carrier upon the application of tension that tightens the retaining strap around said elongate object,
wherein said lean support is pivotable about the mounting arrangement such that the lean support comprises a plurality of operator-set orientations of said at least one elongate extension, relative to said mounting arrangement and perpendicular to the vehicular load carrier, in the event said mounting arrangement is anchored to the vehicular load carrier.

9. The apparatus as recited in claim 8, wherein the mounting arrangement comprises a mounting plate that includes a plurality of open channels extending through said mounting plate to receive bolts of connecting assemblies for attaching said guide to said load carrier.

10. The apparatus as recited in claim 9, wherein said connecting assemblies comprise an elongate bracket having an opening at opposing ends for engaging bolts inserted into said open channels of said mounting plate.

11. The apparatus as recited in claim 8, wherein said strap retention head is pivotally coupled to said mounting arrangement by a first elongate bar and a second elongate bar attached at opposite sides of a hinge, the first elongate bar being orientated substantially parallel to the second elongate bar.

12. The apparatus as recited in claim 8, wherein said guide is held against said load carrier.

13. The apparatus of claim 8, wherein the strap retention head is located at a centerline portion of the vehicle, said centerline portion extending along the center of the vehicle extending in the longitudinal direction of said vehicle.

14. A guide for securing an elongate article to a vehicle load carrier comprising at least one load bar mounted to a vehicle, said guide comprising:
a mounting assembly;
a connecting member comprising two parallel elongate extensions configured to receive at its sides the weight of an elongate article; and
a strap retention head for receiving a retaining strap therethrough, wherein said mounting assembly is secured to said at least one load bar and pivotally secures said connecting member at a first end thereof, said strap retention head being mounted to a second end of said connecting member at least one connection point and located midway between driver and passenger sides of said vehicle and comprising a strap retaining aperture;
wherein said connecting member is pivotable about the mounting assembly such that the connecting member comprises a plurality of operator-set orientations of said parallel elongate extensions, relative to said mounting arrangement and perpendicular one of the at least one load bar, in the event said mounting arrangement is anchored to the vehicular load carrier.

15. The guide as recited in claim 14 wherein said guide is detachably securable to said load bar.

16. The guide as recited in claim 14 wherein said connecting member pivots in a direction that is substantially normal to a longitudinal axis of said load bar.

17. The guide as recited in claim 16 further comprising a gripping assembly, said gripping assembly adjustably arresting pivotal movement of said connecting member with respect to said mounting assembly.

18. The guide as recited in claim 14 wherein said strap retaining aperture is closed.

19. The guide as recited in claim 14 wherein said strap retaining aperture is disposed at a terminal end of said connecting member that is opposite said first end.

20. The guide as recited in claim 14 comprising a plurality of connecting members, each connecting member comprising two parallel elongate extensions configured to receive at its sides the weight of an elongate article.

21. The guide as recited in claim 14 wherein said retaining strap comprises a buckle assembly.

22. The guide of claim 14, wherein the second end of the connecting member is located at a centerline portion of the vehicle, said centerline portion extending along the center of the vehicle in the longitudinal direction of said vehicle.

23. A load carrying assembly to be mounted on a vehicle for securing an elongate article thereon, said load carrying assembly comprising:
   a plurality of load bars;
   a plurality of guides, at least one of said plurality of guides mechanically and pivotally secured to at least one of said plurality of load bars at a location midway between driver and passenger sides of the vehicle;
   said guides each comprising a lean support configured to receive at its sides the weight of an elongate article, said lean support comprising a strap retention head and at least one elongate extension, said strap retention head being mounted to said elongate extension at least one connection point and having a closed strap retaining aperture formed in the strap retention head;
   an aperture disposed along a length of each said guide; and,
   at least one retaining strap threadably received by each said aperture, said at least one retaining strap disposed about said elongate article and secured to said load bars;
   said lean support comprises a plurality of operator-set orientations of said elongate extension relative to and perpendicular to one of said plurality of load bars.

24. The load carrying assembly as recited in claim 23 wherein said retaining strap is disposed about said elongate article, said load bars and secured upon itself.

25. The load carrying apparatus of claim 23, at least one of said plurality of guides mechanically and pivotally secured to at least one of said plurality of load bars at a centerline portion of the vehicle, said centerline portion extending along the center of the vehicle in the longitudinal direction of said vehicle.

26. A system for conveniently securing an elongate article to a load carrier attached to a carrying vehicle, said system comprising:
   a carrying vehicle;
   a load carrier attached to said vehicle;
   a mounting arrangement to be anchored to a vehicular load carrier;
   a lean support configured to receive at its sides the weight of a surfboard, snowboard or watercraft for leaning thereagainst, said lean support pivotally attached to said mounting arrangement and comprising at least one elongate extension and a strap retention head, said at least one elongate extension extending from said mounting arrangement and being received by said strap retention head at least one connection point,
   said strap retention head being elevated above said load carrier, said strap retention head having an aperture formed therein and configured to threadably receive a securement strap therethrough thereby trapping said strap at said strap retention head for ready grasping by an operator installing the surfboard, snowboard or watercraft onto the load carrying apparatus;
   wherein said lean support is pivotable about the mounting arrangement such that the lean support comprises a plurality of operator-set orientations of said at least one elongate extension relative to said mounting arrangement and perpendicular to the vehicular load carrier, in the event said mounting arrangement is anchored to the vehicular load carrier.

27. The system of claim 26, wherein the strap retention head is located at a centerline portion of the vehicle, said centerline portion extending along the center of the vehicle in the longitudinal direction of said vehicle.

\* \* \* \* \*